United States Patent [19]

Haytayan

[11] 4,218,953
[45] Aug. 26, 1980

[54] SELF-PIERCING POP RIVET FASTENERS

[76] Inventor: Harry M. Haytayan, Sunnyside La., Lincoln, Mass.

[21] Appl. No.: 888,752

[22] Filed: Mar. 21, 1978

Related U.S. Application Data

[63] Continuation of Ser. No. 729,028, Oct. 4, 1976, abandoned.

[51] Int. Cl.² .................... F16B 13/06; B65D 85/24
[52] U.S. Cl. ............................. 85/68; 85/1 P; 85/81; 85/84; 206/346; 206/347
[58] Field of Search ............... 85/68, 72, 82, 83, 84, 85/1 P, 5 R, DIG. 2, 77, 78, 81; 206/343, 344, 345, 346, 347; 24/217 R

[56] References Cited

U.S. PATENT DOCUMENTS

| 1,428,111 | 9/1922 | Molesworth | 85/1 P X |
|---|---|---|---|
| 2,898,798 | 8/1959 | Carno | 85/84 |
| 2,994,243 | 8/1961 | Langstroth | 85/84 X |
| 3,044,340 | 7/1962 | Luhm | 85/83 |
| 3,083,429 | 4/1963 | Barlow et al. | 206/345 X |
| 3,198,058 | 8/1965 | Barry | 85/84 |
| 3,211,284 | 10/1965 | Anstett | 206/346 |
| 3,461,772 | 8/1969 | Barry | 85/84 X |

FOREIGN PATENT DOCUMENTS

| 2550787 | 5/1977 | Fed. Rep. of Germany | 85/83 |
|---|---|---|---|
| 1552550 | 11/1968 | France | 85/68 |
| 735406 | 8/1955 | United Kingdom | 85/10 E |
| 1289819 | 9/1972 | United Kingdom | 85/68 |
| 1443123 | 7/1976 | United Kingdom | 85/72 |

Primary Examiner—Rodney H. Bonck
Attorney, Agent, or Firm—Schiller & Pandiscio

[57] ABSTRACT

A new pop rivet assembly is disclosed, wherein said device is capable of forming a rivet hole in a workpiece, inserting a pop rivet into the hole and securing it in place in response to an operator's single blow using a conventional hammer, pneumatic driver or similar device.

37 Claims, 13 Drawing Figures

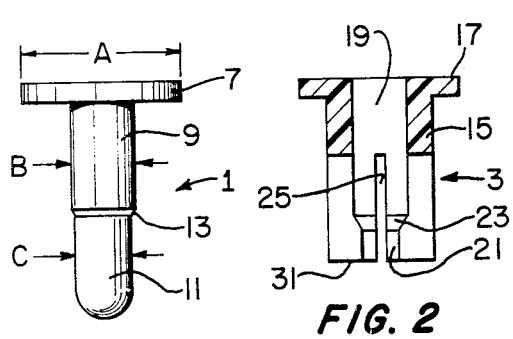
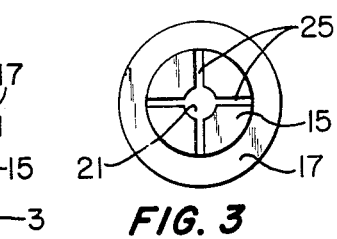
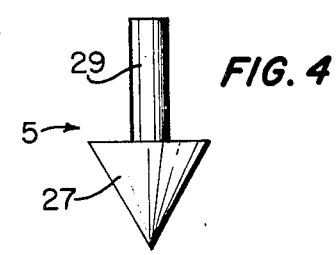
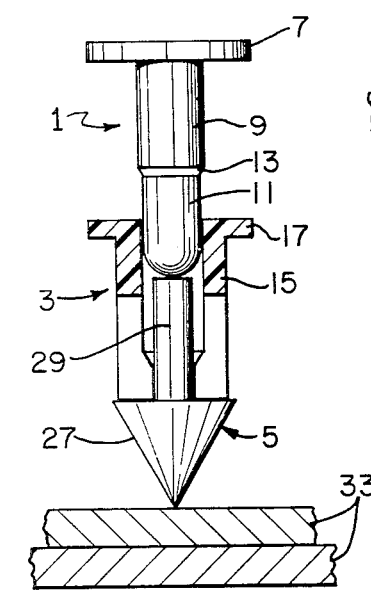
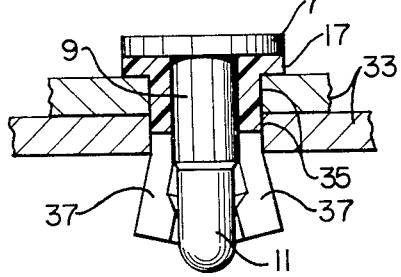
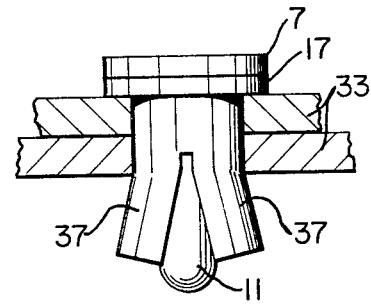
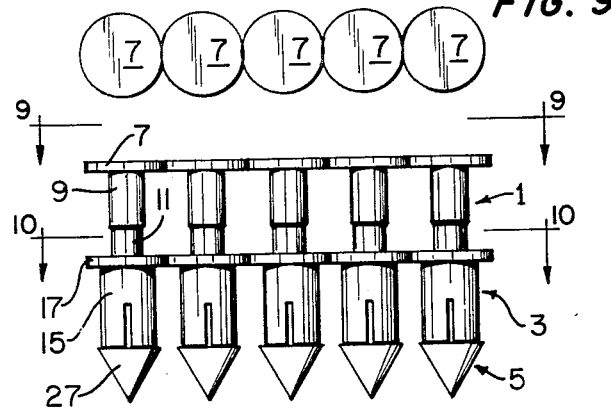
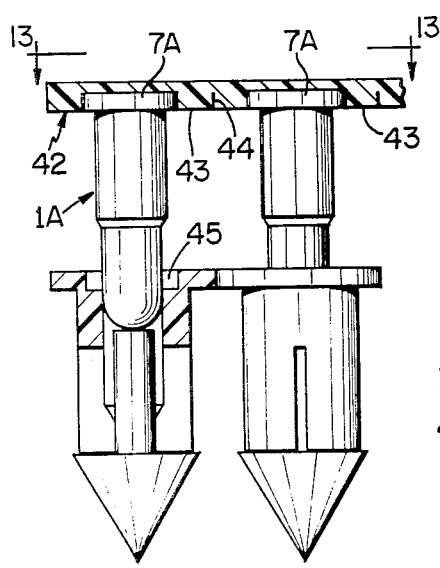
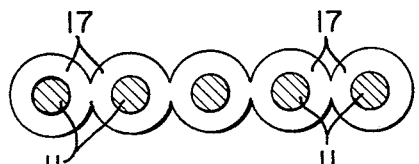
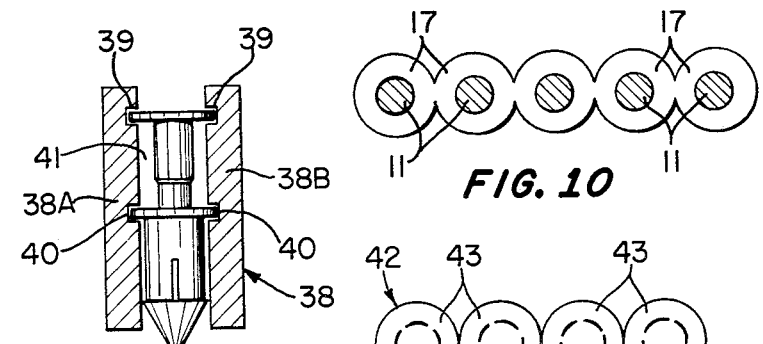
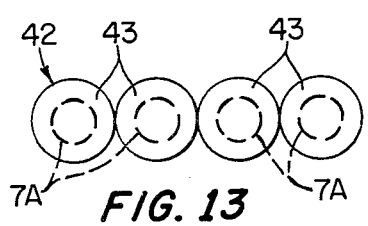

SELF-PIERCING POP RIVET FASTENERS

This is a continuation of my copending application Ser. No. 729,028, filed Oct. 4, 1976, and now abandoned, for Self-Piercing Pop Rivet Fasteners.

The following invention relates to riveting devices used for fastening together two or more sheets of material, and in particular to new types of pop rivet fasteners.

Conventional pop rivet fasteners are well known to one skilled in the art. A typical pop rivet assembly consists of two primary parts, a drive pin and a rivet housing. The drive pin is essentially a solid cylindrical rod made of a hardened material, such as steel. The housing is basically a hollow cylindrical tube open at both ends with a peripheral flange at its top end. The inside of the housing is a hollow cylindrical cavity emerging through both ends of the housing and having a diameter slightly less than the diameter of the drive pin on the top and tapering to a reduced size towards the bottom of the housing. The bottom of the housing is slit lengthwise in three or four locations (120° or 90° apart so as to be equally spaced) and these slits extend upwards along the housing for some fraction of its total length, stopping before they reach the top flange. The length of the housing left unslit is determined by the thickness of the materials to be joined.

In the assembled pop rivet device the drive pin is mounted into the housing from the top so that a part of its length is exposed above the flange on the housing. The drive pin is held in place through a friction fit, since the pin is slightly larger than the upper housing cavity, and extends as far down into the housing chamber as the tapered housing interior allows without deforming the rivet housing. Note that the total length of the drive pin is greater than the total length of the housing.

The conventional pop rivet fastener is used in the following manner. First the materials to be joined, which are typically thin metal base sheets, are placed against one another. Then a hole is drilled through the sheets where the rivet is to be placed, with the hole diameter just large enough to accommodate the rivet housing. Next the rivet is inserted bottom first into the hole by hand for affixing, with the top flange prohibiting the rivet from being pushed completely through the base sheets. The rivet is properly positioned when the base of the top flange lies flush against the top base sheet. The length of the rivet housing is chosen in conjunction with the materials being joined so that part of the housing will emerge from the other side of the base sheets from which it entered.

The rivet is then affixed in the following manner. A blow is delivered by the operator to the head of the rivet, striking the drive pin which protrudes above the housing flange. The pin is thus driven further downward into the housing's tapered interior cavity where the force of the blow, assisted by the slits in the housing, causes the housing to mushroom open on the other side of the base sheets thereby securely fixing the rivet, and hence the sheets to be joined, in place. In the usual case the top of the drive pin is flush with the top flange and the bottom of the pin emerges slightly from the bottom of the split housing when the riveting is completed. The operating blow which starts this sequence is delivered by an operator using a simple hand hammer, pneumatic tool or similar device.

This conventional type of rivet fastener, while effective, encounters a number of problems in application. First, a rivet hole must be bored in the workpiece in an operation separate from the riveting itself. Next the rivet must be inserted into this hole by hand. Then the operator must actually fix it in place. Clearly, this three-step riveting method is time consuming. Furthermore, in most cases and in particular where the workpiece is composed of thin metal sheets, the riveting process tends to distort the sheets, necessitating the need for heavy supports.

Some of the objects of the present invention are the solution of the previously mentioned problems involving pop rivet fasteners. One such object is to unify the conventional three-step riveting process into one simple operation to be performed by an operator using a simple hammer, pneumatic tool or similar device. A second object is to remove the need for additional time and equipment to bore the rivet holes. A third object is to decrease or completely eliminate workpiece distortion occurring during convention riveting operations.

Another important object is to provide a plurality of pop rivet assemblies in strip form for use with an automatic driving tool for speeding up deployment of the rivets.

These and other objects are intended with the present invention, which is better described in the following specifications which are to be considered together with the accompanying drawings wherein like numbers refer to like parts and:

FIG. 1 shows a side view in elevation of a driving pin which is part of a pop rivet fastener that constitutes a preferred embodiment of the invention;

FIG. 2 shows a longitudinal section of the housing of the preferred embodiment of the invention;

FIG. 3 shows a bottom view of the same housing;

FIG. 4 shows a side view in elevation of the piercing pin of the preferred embodiment of the invention;

FIG. 5 shows a side view, partly in section, of the preferred embodiment of the invention in position above two plates prior to impacting by an operator's tool;

FIG. 6 shows a side view, partly in section, of the preferred embodiment after impact of operator's tool;

FIG. 7 shows a side view in elevation of the preferred embodiment after impacting by an operator's tool;

FIG. 8 shows a side view in elevation of a second embodiment of this invention comprising a plurality of rivet fasteners assembled in strip form;

FIG. 9 shows a top view taken along line 9—9 of FIG. 8;

FIG. 10 shows a cross-sectional view taken along line 10—10 of FIG. 8;

FIG. 11 is a cross-sectional view in elevation of the preferred embodiment of this invention mounted in a magazine chamber for use with a driving tool;

FIG. 12 shows a side view, partly in section, of a third embodiment of this invention comprising a plurality of rivet fasteners assembled in strip form; and FIG. 13 shows a top view taken along line 13—13 of FIG. 12.

The pop rivet assembly of FIGS. 1–7 consists of three primary parts; a drive pin 1, a rivet housing 3, and a piercing pin 5. As shown in FIG. 1, the drive pin consists of a solid disc-like top circular top flange 7 of diameter A from which extends downward a solid cylindrical shaft 9 of diameter B. This shaft is stepped so as to provide a bottom section 11 with a diameter C. Preferably the junction of bottom section 11 with the upper section of shaft 9 is tapered as shown at 13. Preferably, but not necessarily, the shaft section 11 is rounded at its bottom end as shown. Diameter A is greater than diameter B by a significant amount and preferably, diameter B exceeds diameter C by approximately 0.001 to 0.005 inches. The drive pin is constructed of a very strong and hard material, e.g. steel, and is of singular construction.

FIG. 2 shows a preferred embodiment of the rivet housing. This housing is basically a hollow cylindrical tube 15 with an enlarged peripheral top flange 17 and open on both ends. The entire housing is of unitary construction and preferably is made of plastic but can be made of aluminum, steel or other suitable material. The tube 15 has a center bore which consists of a relatively large cylindrical upper section 19, a relatively short cylindrical lower section 21, and a relatively short tapered or frusto-conical section 23, with section 19 having a larger diameter than section 21. The housing is slit lengthwise in four locations at the bottom so as to form four finger-like members 37. The slits 25 are equally spaced from one another 90° apart. Of course a different number of slits could be provided, e.g., three slits spaced apart 120°. The slits extend upwards along the housing for a fraction of its total length. The length of the housing left unslit and the length of the housing itself are determined by the thickness of the base sheets being joined. In the preferred embodiment, flange 17 of the housing is approximately the same diameter as the flange 7 of the drive pin; furthermore, the diameter of the upper section 19 of the center bore of housing 3 is slightly less (0.001 to 0.003 inches) than the lower section 11 of the drive pin and the entire length of the housing is something less than the length of the entire drive pin shaft.

As shown in FIG. 4, the piercing pin 5 is comprised of a conical head 27 with a cylindrical shaft 29 protruding from the center of the head's flat base. Shaft 29 has a diameter slightly greater (0.002 to 0.004 inches) than the lower section 21 of the center bore of housing 3. This pin is constructed of a very hard and strong material, e.g., hardened steel, and is of singular construction. The conical head 27 of the drive pin has a diameter at its base slightly greater (0.005 to 0.010 inches) than the outer diameter of tube 15, but still less than the diameter of flange 17 of the housing.

The drive pin, housing and piercing pin are assembled in the manner shown in FIG. 5. The cylindrical shaft 29 of the piercing pin is inserted into bore section 21 at the bottom of the housing until the base of its conical head 27 is flush with the flat bottom end surface 31 of the housing. Note that the diameter of shaft 29 is actually slightly larger than the diameter of the lower bore section 21 of the housing so as to form a simple friction fit to hold the piercing pin in place, and that shaft 29 is long enough to extend into the upper bore section 19.

The lower section 11 of the drive pin is then inserted into the top of the housing via bore section 19. Preferably the drive pin is inserted far enough for its bottom end to make contact with the top of the piercing pin's shaft 29 and so that part of the lower section 11 will still be exposed above the housing in the manner indicated in FIG. 5. Note that the lower section 11 of the drive pin shaft has a diameter suitably larger than bore section 19 so as to form a friction fit to hold the parts in position.

This new pop rivet fastener is used and operates in the following manner. First, the materials to be joined, represented as two thin metal sheets 23, are placed against one another. Then the rivet assembly, head 27 of the piercing pin leading, is placed against the sheets 33 and an operator delivers a blow to the top of the drive pin flange 7. This blow may be delivered by an ordinary hammer, pneumatic gun, or similar device.

The operator's blow activates the followed sequence of events. The drive pin 1 is forced downward into the housing, and in so doing it drives the piercing pin into sheets 33. When the initial blow is of suitable magnitude, the piercing pin will be driven entirely through sheets 33, thereby forming a rivet hole 35 in each sheet. Meanwhile, drive pin 1 continues into the housing, with the upper section of shaft 9 of the drive pin encountering the upper end of housing 3 and thereby carrying the housing into the newly created aligned rivet holes 35. The flange 17 of the housing, being of wider diameter than the conical head 27 of the piercing pin which formed the rivet holes, is stopped by the top base plate. The length of rivet housing 3 is such that its bottom end protrudes below the bottom base sheet 33 when flange 17 is engaged with the top base sheet. The drive pin continues downward under the force of the initial impact, and as it does, the upper section of its shaft 9 expands the housing 3 to grip the surrounding surfaces of base sheets 33 which define the holes 35. Finally, the tip of the drive pin 1 encounters the tapered bore section 23 of the housing and, with the aid of housing slits 25, forces the finger-like members 37 of the housing to spread apart in the manner shown in FIGS. 6 and 7, whereby the bottom end of the housing clinches the bottom base plate and securely fixes the rivet in place with top flange 17 being clamped to the top base sheet by flange 7 and the bottom end of shaft 9 of drive pin 1 protruding from the popped housing on the other side of the base plates. Clearly, the number of members 37 that form essential parts of the rivet housing is determined by the number of slits 25 and may be varied without departing from the present invention. In the operation of the device the piercing pin does not separate from the hollow housing until after the latter starts to penetrate the workpiece. It is to be noted also that the outer diameter of the piercing pin's conical head is larger than the outer diameter of the hollow housing, with the result that the hole formed in the workpiece by the piercing pin is larger that the housing. This assures that there is no obstacle to the housing penetrating the workpiece and hence the housing will not buckle or otherwise be damaged as a result of interference by the workpiece.

There are numerous advantages to using this invention instead of conventional pop rivets. First, no pre-drilling of the rivet holes is required. Drilling and fastening are done in one quick operation. Furthermore, the rivet does not have to be inserted in the rivet hole by hand, since it is positioned as part of the three-step riveting procedure. Additional gripping strength is provided by the expanded housing 15. Furthermore, when this invention is used in conjunction with a fast-acting tool, such as a pneumatic driver, the piercing of the thin base plates is accomplished so fast that no significant distortion of the base plates takes place even when the rivet is used without any support for the base plates. Should a support be used in conjunction with a fast-acting tool, the base metal distortion will then be completely eliminated.

Additionally, a plurality of these rivets may be assembled in strip form as embodied in FIG. 8. These strips may then be fed into a suitable pneumatic tool for driving, thus saving labor costs and worker fatigue by a higher operating speed and semiautomated operation.

The rivet strips of FIG. 8 are constructed in the following manner. The top disc flanges of the drive pins are aligned tangentially to one another in a linear array, and may or may not be fastened to one another. They are shown in an unfastened mode in FIG. 9. The rivet housings are also aligned linearly so that their top flanges meet tangentially to one another, as may be seen in FIG. 10. These flanges 17 are attached to one another at their point of mutual tangency to fix the rivets in strip form. This attachment may be achieved by molding a number of housings as an integral strip, or the housings may be formed independently of one another and their flanges bonded to one another as a subsequent operation. In either case the region where each flange 17 is joined to an adjacent flange is made weak enough for it to be separated by a shearing action produced by a hammer.

This strip of pop rivets shown in FIG. 8 may be used in conjunction with a magazine as shown at 38 in FIG. 11. The magazine 38 has opposite side walls 38A and 38B. Each wall is formed with two grooves 39 and 40. Grooves 39 oppose one another near the top of the magazine while grooves 40 oppose one another nearer the bottom. The dimensions of the magazine are such that a strip of rivets, or even a single rivet, may be inserted into the magazine's interior chamber 41 from a direction perpendicular to the plane of the cross-sectional view. The flanges 7 of the upper drive pins will ride in the upper set of grooves 39 and the flanges 17 of the rivet housings will ride in the lower set of grooves so as to be fully constrained in the two dimensions of the drawing's plane. Thus the strip of pop rivets may be moved perpendicularly along chamber 41 while being guided by the housing's grooved walls, whereby each rivet can be fed in turn out of the magazine into position to be drive into a workpiece. It is contemplated that the magazine containing the strip of rivets will be used in conjunction with a pneumatic tool of the type shown in U.S. Pat. No. 3,954,176, issued May 4, 1976 to Harry M. Haytayan.

A strip of rivets adapted to be used with a magazine fed driver e.g., of the type shown in said U.S. Pat. No. 3,954,176, may also be assembled in the manner shown in FIGS. 12 and 13. This modification requires that the rivet assembly of FIGS. 1–10 be modified slightly by forming the drive pin with a top flange 7A that is smaller than flange 7 and hence smaller than the housing flange 17. As in FIGS. 1–10, the top flanges 17 of the rivet housings are mutually tangent or nearly so, depending how the rivets are coupled to one another. While the rivets are attached to one another at points of mutual tangency, this attachment may be achieved by molding a number of housings as an integral strip as in FIG. 8, or the forming housings independently of one another and bonding their flanges to one another as a subsequent operation. Preferably, however a plastic strip 42 is formed around and joins the top flanges 7A in the manner shown in FIGS. 12 and 13. This strip consists of a series of circular caps 43 with an outer diameter substantially the same as the outer diameter of housing flanges 17 and joined tangenntially to one another in strip form. Each cap 43 has an inner diameter slightly smaller (0.003 to 0.006 inches) than the top flange 7A of the driven pin and is made of a material which has just enough elasticity to allow the ring to stretch and make a friction-tight fit when it is pressed onto a flange 7A, whereby the caps coact to hold the drive pins and hence the rivet assemblies in place as an integral strip of rivets. Strip 42 is weakened at the points where caps 43 join one another, e.g. by providing razor slits 44, so as to allow the hammer of a pneumatic driver as shown in U.S. Pat. No. 3,954,176 to shear off a cap 43 when that ring and/or the corresponding flange 7A is impacted by the hammer.

It is to be noted that the rivet assembly of FIGS. 12 and 13 may but need not include a depression 45 in the top of the housing identical in size and shape to the top flange 7A so that when the drive pin is forced downwards during the riveting operation, its flange 7A will come to rest flush with the top of the housing.

Finally, it should be noted that the preferred embodiments illustrated and described herein are intended solely for the sake of example and clarity and are to be in no way construed as limiting the scope of the present invention, since various alterations may be carried out on the illustrated embodiments without departing from the essential features of the invention. Thus, for example, one may vary the number of slits 25 in the rivet housing, provide grooves in the tapered head 27 of pin 5 to improve its piercing action, or alter the cross-sectional shape of one or more components of the rivet assembly from circular to a polygonal design of three, four or even more sides. Also contemplated is providing a razor slit like slit 44 at the point where flanges 17 are joined to one another, whereby to facilitate detachment of successive rivet assemblies by the shearing action of the hammer of a pneumatic tool such as the one shown in said U.S. Pat. No. 3,954,176. Furthermore, one may vary the materials of which the components of the rivets are made. Preferably the driving and piercing pins are made of metal and the housing is made of plastic. However, all three elements of the rivet may be made of the same material of same kind of material, e.g. all metal or all plastic. Further by way of example, pins 1 and 5 may be made of steel and housing 3 may be made of aluminum. Also the strip 42 may be made of a soft metal, e.g. aluminum while the pin 1A may be made of steel. Preferably strip 42 is made of polyethylene while housings 3 are made of polypropylene.

In any event the materials selected for the striking pin and the piercing pin must have sufficient hardness to function as herein described, while the housing must have sufficient tensile strength and resiliency and bending strength to expand and secure itself to the workpiece.

These and other changes of their type are foreseen as readily obvious to one skilled in the art.

What is claimed is:

1. A pop rivet assembly capable of forming a rivet hole in a workpiece consisting of at least two members, inserting a pop rivet into the rivet hole, and securing it in place in response to a single blow by an operator, said assembly comprising as distinct and separable elements:
   (a) a piercing pin for punching a hole through the workpiece upon application of a force;
   (b) a hollow housing having a top end and a bottom end; and
   (c) a drive pin for (i) transmitting a force to the piercing pin to punch a hole through the workpiece, (ii) emplacing the housing in said hole, and (iii) affixing the housing to said workpiece;
   said piercing pin comprising a pointed head and a shaft integral with and protruding from the base of said painted head, with said shaft extending into the bottom end of said housing and being gripped by said housing and said pointed head outside of and adjacent to the bottom end of said housing, said pointed head having a diameter greater than the diameter at the bottom end of said housing;

said drive pin extending into and projecting from the top end of said housing;

said piercing pin and said drive pin each being separately attached to said housing;

said drive pin and housing being arranged so that when said drive pin is driven further into said housing in the direction of said piercing pin said drive pin will drive the piercing pin out of the housing and also radially expand the bottom end of the housing; and said drive pin having a peripheral flange located outside of said housing which is sufficiently large in diameter to be intercepted by an end surface of said housing when said drive pin is driven into said housing in the direction of said piercing pin.

2. A pop rivet assembly according to claim 1 wherein the length of said drive pin is greater than the length of said housing.

3. A pop rivet assembly according to claim 1 wherein said housing is made of a thermoplastic organic polymer material.

4. A pop rivet assembly according to claim 3 wherein said drive pin and said piercing pin are formed of a hard metallic material.

5. A pop rivet assembly according to claim 1 wherein said piercing pin and said drive pin are frictionally gripped by said housing and said housing has a plurality of slits at its bottom end to facilitate its expansion when the drive pin is driven in the direction of said piercing pin.

6. A pop rivet assembly according to claim 1 wherein said housing has a center bore with a relatively large diameter at its top end and a relatively small diameter at its bottom end, and further wherein said drive pin has a shaft extending within said housing with at least one section of said shaft having a diameter greater than the diameter of the bottom end of the said bore.

7. A pop rivet assembly according to claim 6 wherein the length of said drive pin is greater than the length of said housing, and the shaft of said piercing pin projects into the bottom end of said bore and terminates below said drive pin.

8. A pop rivet assembly according to claim 1 and at least one additional like pop rivet assembly attached thereto in side by side relation so as to form a strip of pop rivet assemblies.

9. A pop rivet assembly according to claim 8 wherein at least one additional like pop rivet assembly is attached thereto by a joining of its housing to the housing of the first-mentioned pop rivet assembly.

10. A pop rivet assembly according to claim 1 wherein said drive pin has a top flange matched in size to a counterbore in the top of the hollow housing so that the drive pin flange may be flush with the top of the housing upon completion of the riveting action.

11. A pop rivet assembly comprising as distinct and separable elements:
(a) a piercing pin for punching a hole through a workpiece upon application of a force;
(b) a hollow housing having a top end and a bottom end; and
(c) a drive pin for (i) transmitting a force to the piercing pin to punch a hole through the workpiece, (ii) emplacing the housing in said hole, and (iii) affixing the housing to said workpiece;

said housing having a center bore with a relatively large diameter at its top end and a relatively small diameter at its bottom end;

said drive pin shaft being stepped and having a bottom section with a diameter slightly greater than the diameter of the top end of said bore and at least one section with a diameter greater than the diameter of the bottom end of said bore;

said piercing pin extending into and projecting from the bottom end of said housing, and said bottom section of said drive pin shaft extending into and projecting from the top end of said housing, with said piercing pin and said drive pin each being separately attached to said housing;

said drive pin and housing being arranged so that when said drive pin is driven further into said housing in the direction of said piercing pin said drive pin will drive the piercing pin out of the housing and also radially expand the bottom end of the housing; and said drive pin having a peripheral flange located outside of said housing which is sufficiently large in diameter to be intercepted by an end surface of said housing when said drive pin is driven into said housing in the direction of said piercing pin.

12. A strip of pop rivet assemblies comprising:
(a) a plurality of piercing pins for punching holes through a workpiece upon application of a force;
(b) a plurality of hollow housings each having a top end and a bottom end and attached to one another in side-by-side relation; and
(c) a plurality of drive pins for
  (a) transmitting a force to the piercing pins to punch holes through the workpiece;
  (b) emplacing the housings in said holes, and
  (c) affixing the housings to said workpieces;

each of said drive pins and said piercing pins being a separate and distinct element; and said drive pins and said piercing pins extending into and protruding from the top and bottom ends respectively of said housings, said piercing pins and said driving pins being separately attached to said housings, said drive pins having peripheral shoulders located outside of said housings which are sufficiently large in diameter to be intercepted by an end surface of said housings when said drive pins are driven into said housings in the direction of said piercing pins, said drive pins and housings being arranged so that the bottom ends of said housings will expand when said drive pins are driven further into said housings in the direction of said piercing pins, said piercing pins having pointed heads projecting from the bottom ends of said housings which have a diameter at least as great as the outside diameter of said bottom ends of said housings, and said driving pins having a length such that when they are driven further into said housings they will drive said piercing pins out of the bottom ends of said housings.

13. A strip of pop rivet assemblies according to claim 12 wherein said piercing pins comprise conical heads and shafts protruding from the bases of said conical heads, with said shafts extending into the bottom ends of said housings.

14. A strip of pop rivet assemblies according to claim 12 wherein said piercing pins and said driving pins have shafts which are gripped by said housings.

15. A strip of pop rivet assemblies according to claim 14 wherein said housings are generally cylindrical in shape and each drive pin shaft has an upper section which terminates with a flanged head having a diameter that is greater than the outer diameter of said housings, said peripheral shoulders being surfaces on said flanged heads.

16. A strip of pop rivet assemblies according to claim 13 wherein said piercing pins are formed of a hardened steel and said housings are made of an organic polymer material.

17. A strip of pop rivet assemblies according to claim 7 wherein said housings comprise tubes with top and bottom ends and peripheral flanges at said top ends, and further wherein the bottom ends of said tubes are adapted to expand when said drive pins are driven into said housings from the top ends thereof.

18. A strip of pop rivet assemblies according to claim 17 wherein said housings are slit lengthwise at their bottom ends to facilitate expansion of said bottom ends when said drive pins are driven further into said housings in the direction of said piercing pins.

19. A strip of pop rivet assemblies according to claim 12 wherein the length of said drive pins is greater than the length of said housings.

20. A strip of pop rivet assemblies according to claim 12 wherein said housings are attached tangentially to one another.

21. A strip of pop rivet assemblies according to claim 20 wherein said attachment may be by either molding the housings dependently as an integral strip or by forming the housings independently of one another and attaching them together in a later operation.

22. A strip of pop rivet assemblies according to claim 12 wherein said piercing pins and said driving pins are made of a harder material than said housings.

23. A strip of pop rivet assemblies according to claim 22 wherein said housings are made of a material from the class consisting of thermoplastic organic polymers and aluminum and said piercing pins and driving pins are made of a metallic material.

24. A strip of pop rivet assemblies according to claim 12 wherein each drive pin has a shaft and a flanged head at the upper end of its shaft with said peripheral shoulders being surfaces on said flanged heads, and further wherein each housing has an end surface at its upper end with a depression sized to receive the flanged head on the corresponding drive pin when said pin is driven further into the housing in the direction of the corresponding piercing pin.

25. A strip of pop rivet assemblies according to claim 24 wherein said depressions and flanged heads are arranged so that when the drive pins are driven further into the housings, said heads can be positioned flush with the upper end surfaces of the housings.

26. A strip of pop rivet assemblies comprising:
(a) a plurality of piercing pins for punching holes through a workpiece upon application of a force;
(b) a plurality of hollow housings each having a top end and a bottom end and attached to one another in side-by-side relation; and
(c) a plurality of drive pins for
(a) transmitting a force to the piercing pins to punch holes through the workpiece;
(b) emplacing the housings in said holes, and
(c) affixing the housings to said workpieces;
each of said drive pins and said piercing pins being a separate and distinct element;
each housing having a bore extending from its said top end to its said bottom end, with said bore having an upper section with a first selected diameter and a lower section with a second selected diameter smaller than said first selected diameter; said drive pins comprising shafts having upper sections with a first diameter and lower sections with a second diameter which is smaller than said first diameter and greater than said first selected diameter; said piercing pins having shafts with a diameter greater than said second selected diameter, said driving pins having their lower sections disposed in the upper sections of said bores and gripped by said housings and said piercing pins having their shafts disposed in the lower sections of said bores and gripped by said housings; and
said drive pins having peripheral shoulders located outside of said housings which are sufficiently large in diameter to be intercepted by an end surface of said housings when said drive pins are driven into said housings in the direction of said piercing pins, and said drive pins and housings being arranged so that the bottom ends of said housings will expand when said drive pins are driven further into said housings in the direction of said piercing pins.

27. A strip of pop rivet assemblies according to claim 26 wherein said housings have a peripheral flange at their upper ends and the peripheral shoulders on said drive pins have a diameter smaller than the peripheral flanges on said housings.

28. A strip of pop rivet assemblies according to claim 27 wherein said drive pin shoulders are flanges surrounded by concentric rings which are attached to one another, and further wherein said rings are made of a plastic material and form a strip which is weakened at the regions where said rings are attached to one another.

29. A strip of pop rivet assemblies comprising:
(a) a plurality of piercing pins for punching holes through a workpiece upon application of a force;
(b) a plurality of hollow housings each having a top end and a bottom end and attached to one another in side-by-side relation; and
(c) a plurality of drive pins for
(a) transmitting a force to the piercing pins to punch holes through the workpiece,
(b) emplacing the housings in said holes, and
(c) affixing the housings to said workpieces;
each of said drive pins and said piercing pins being a separate and distinct element; and
said drive pins and said piercing pins extending into and protruding from the top and bottom ends respectively of said housings, said piercing pins and said driving pins being separately attached to said housings, said drive pins having peripheral shoulders located outside of said housings which are sufficiently large in diameter to be intercepted by an end surface of said housings when said drive pins are driven into said housings in the direction of said piercing pins, and said drive pins and housings being arranged so that the bottom ends of said housings will expand when said drive pins are driven further into said housings in the direction of said piercing pins;

said housings having a relatively large diameter orifice at their upper ends and a relatively small diameter orifice at their lower ends, and each of said drive pins having a shaft with a diameter greater than the diameter of the orifice at the bottom ends of the housings.

30. A strip of pop rivet assemblies according to claim 24 wherein the shaft of each of said drive pins has a bottom section with a diameter slightly greater than the diameter of the orifice in the upper end of the housings.

31. A pop rivet assembly capable of forming a rivet hole in a workpiece consisting of at least two members, inserting a pop rivet into the rivet hole and securing it in place in response to a single blow by an operator, said assembly comprising as distinct and separable elements:
 (a) a piercing pin for punching a hole through the workpiece upon application of a force;
 (b) a hollow housing having a top end and a bottom end; and
 (c) a drive pin for (i) transmitting a force to the piercing pin to punch a hole through the workpiece, (ii) emplacing the housing in said hole, and (iii) affixing the housing to said workpiece;
said piercing pin comprising a conical head and a shaft protruding from the base of said conical head;
said drive pin comprising a flanged head and a shaft having an upper section with a first diameter and a lower section with a second diameter that is smaller than said first diameter;
said housing having a center bore with an upper section having a relatively large diameter and a lower section having a relatively small diameter; and
said piercing pin shaft extending into said lower section of said center bore and being gripped by said housing at said lower section, and said drive pin shaft lower section extending into the upper section of said bore and being gripped by said housing at said upper section.

32. A pop rivet assembly according to claim 31 wherein said bottom end of said housing is slit lengthwise so as to expand radially when said drive pin is driven downward into said housing, and said piercing pin conical head has a diameter greater than the outside diameter of said housing.

33. A pop rivet assembly according to claim 32 wherein the flanged head of said drive pin is at least as great as the outer diameter of said housing.

34. A pop rivet assembly according to claim 33 wherein said housing has a peripheral flange at its top end for engagement by the peripheral flange of said drive pin.

35. A strip of pop rivet assemblies comprising:
 (a) a plurality of piercing pins for punchings holes through a workpiece upon application of a force, said piercing pins having pointed heads;
 (b) a plurality of hollow housings each having a top end and a bottom end and disposed in parallel relation to one another;
 (c) a plurality of drive pins for
  (a) transmitting a force to the piercing pins to punch holes through the workpiece,
  (b) emplacing the housings in said holes, and
  (c) affixing the housings to said workpieces; and
 severable strip means extending between and connecting said drive pins so as to hold said drive pins in parallel relation to one another;
 each of said drive pins and said piercing pins being a separate and distinct element;
 said drive pins and said piercing pins extending into and protruding from the top and bottom ends respectively of said housings, said piercing pins and said driving pins being separately attached to said housings, and said drive pins and housings being arranged so that when said drive pins are driven further into said housings in the direction of said piercing pins the following actions will occur: (1) the drive pins will drive the piercing pins out of the housings and (2) the drive pins will radially expand the bottom ends of the housings; and
 said pointed heads having an outside diameter at least as great as the outside diameter of the bottom ends of said housings.

36. A pop rivet assembly comprising as distinct and separable elements:
 (a) a piercing pin for punching a hole through a workpiece upon application of a force;
 (b) a hollow housing having a top end and a bottom end; and
 (c) a drive pin for (i) transmitting a force to the piercing pin to punch a hole through the workpiece, (ii) emplacing the housing in said hole, said (iii) affixing the housing to said workpiece;
said housing including a center bore with an upper section having a first selected diameter and a lower section with a second selected diameter smaller than said first selected diameter;
said drive pin comprising (1) a shaft having an upper section with a first diameter and a lower section with a second diameter that is smaller than said first diameter and greater than said first selected diameter, and (2) a peripheral flange on the upper section of its said shaft;
said piercing pin having (1) a pointed head and (2) a shaft with at least a portion of said shaft having a diameter greater than the said second selected diameter of said bore,
the lower section of said drive pin shaft being disposed in the upper section of said bore and gripped by said housing, and the upper section of said drive pin shaft projecting from said housing so that said flange is outside of said housing;
the said portion of said piercing pin shaft being disposed in the lower section of said bore and gripped by said housing and said pointed head being outside of said housing;
said flange being large enough to be intercepted by an end surface of said housing when said drive pin is driven into said housing in the direction of said piercing pin; and said pointed head having a diameter at least as large as the outside diameter of said housing at said bottom end so that when said piercing pin is driven through a workpiece it will form a hole large enough to accommodate said housing.

37. A pop rivet assembly according to claim 36 wherein said housing has a flange at its said top end with a diameter substantially the same as the diameter of said peripheral flange.

* * * * *

UNITED STATES PATENT AND TRADEMARK OFFICE
CERTIFICATE OF CORRECTION

PATENT NO. : 4218953

DATED : August 26, 1980

INVENTOR(S) : Harry M. Haytayan

It is certified that error appears in the above—identified patent and that said Letters Patent are hereby corrected as shown below:

Claim 1, column 6, line 68, "painted" should be -- pointed --.

Claim 17, column 9, line 16, "7" should be -- 12 --.

Signed and Sealed this

Eighteenth Day of November 1980

[SEAL]

Attest:

SIDNEY A. DIAMOND

Attesting Officer     Commissioner of Patents and Trademarks